United States Patent [19]

Kosinski

[11] 4,366,225
[45] Dec. 28, 1982

[54] MONITORING DEVICE WITH PROCESSING SOLUTION RESERVOIRS

[75] Inventor: James J. Kosinski, Rochester, N.Y.

[73] Assignee: Eastman Kodak Company, Rochester, N.Y.

[21] Appl. No.: 259,126

[22] Filed: Apr. 30, 1981

[51] Int. Cl.³ .................. G03C 1/48; G03C 1/40; G03C 5/16; G03B 41/16
[52] U.S. Cl. .................. 430/207; 354/304; 430/208; 430/497; 430/498; 430/499
[58] Field of Search .............. 430/207, 208, 499, 497, 430/498, 496; 250/477; 354/304

[56] References Cited

U.S. PATENT DOCUMENTS

| | | | |
|---|---|---|---|
| 2,659,013 | 11/1953 | Davis et al. | 250/477 |
| 2,852,691 | 9/1958 | Land | 430/207 |
| 2,917,631 | 12/1959 | Hyzer | 430/496 |
| 4,288,533 | 9/1981 | Poshkus | 430/499 |

Primary Examiner—Richard L. Schilling
Attorney, Agent, or Firm—John B. Turner

[57] ABSTRACT

This invention relates to a device for monitoring exposure to influences, such as ionizing radiation, adverse to the human body. The device includes a support which carries material sensitive to the influence. The material is demarcated into a plurality of discrete zones each of which is processable individually by processing composition stored in a respective reservoir. Each reservoir is dischargeable individually to process its related zone. The sensitive material produces an indication visible externally of the device if the exposure to radiation has been greater than a predetermined threshold. The zones are processable at will in single succession.

14 Claims, 6 Drawing Figures

MONITORING DEVICE WITH PROCESSING SOLUTION RESERVOIRS

FIELD OF THE INVENTION

This invention relates to devices for monitoring exposure to influences, such as radiation, toxic gases, toxic or corrosive vapors, sprays or liquids, and biological organisms, adverse to the human body. Some of such devices are commonly referred to as dosimeters.

DESCRIPTION OF THE PRIOR ART

U.S. Pat. No. 2,852,691 to E. H. Land, issued Sept. 16, 1958 discloses a portable device for providing a visible indication of the extent of exposure to nuclear radiation. The device includes an envelope enclosing material sensitive to the radiation and a container of processing composition. When squeezed the container is ruptured and the processing composition flows over the sensitive material, developing it. After a period of processing, the device is peeled apart and a reading is taken to determine the amount of radiation to which the device has been exposed. Such a device has the disadvantage that it cannot provide indications of the amounts of radiation exposure accumulated at a plurality of different times.

SUMMARY OF THE INVENTION

In accordance with the present invention, there is provided a device for monitoring exposure to an influence adverse to the human body. The device includes a support and material sensitive to the influence. The material is processable by processing composition to produce an indication visible at the exterior of the device indicative of the amount of exposure to the influence. A sheet bounds with the support a space for receiving processing composition through a hole in the sheet from a reservoir at the side of the sheet away from the space.

In one embodiment the support and sheet are flexible and the plan area of the space is approximately that of a fingertip. The reservoir overlies the space at the face of the sheet outside the space and the reservoir is burstable by finger pressure to release processing liquid from the reservoir. There are spacer means in the space for limiting movement of the sheet and support toward one another under the influence of finger pressure. The spacer means allows spread of processing liquid even in the presence of finger pressure. The finger pressure prevents pillowing of the support and sheet due to pressure in the liquid in the space.

In another embodiment there is a first sheet having apertures and which is sealed to the support. The apertures establish a plurality of discrete zones on the support. There is a second sheet sealed to the first sheet.

Another embodiment is intended for periodically monitoring exposure to the influence adverse to the human body. In this embodiment there is a sheet having apertures which is sealed between the support and the above-mentioned sheet. The apertures establish a plurality of discrete zones on said support. The two sheets and the support bound chambers in the apertures. There are a plurality of reservoirs of processing composition, one for each of the zones. Processing composition from a reservoir flows, upon discharge, through a related hole in the above-mentioned sheet to the related zone.

Still other aspects of the invention and more specific features will become apparent to those skilled in the art from the following description with reference to the accompanying drawings.

BRIEF DESCRIPTION OF THE DRAWINGS

In the detailed description of the embodiments of the invention presented below, reference is made to the accompanying drawings, in which.

DETAILED DESCRIPTION OF EMBODIMENTS

Figure 1:
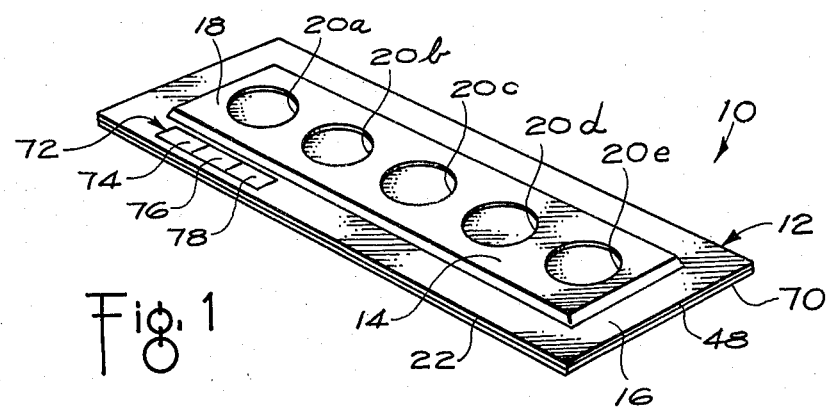
FIG. 1 illustrates a perspective view of a device in accordance with one embodiment of the present invention.
Figure 3:
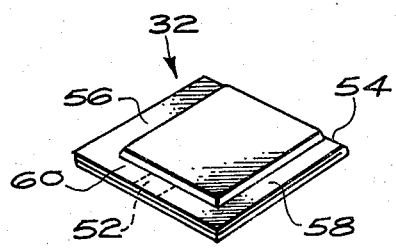
FIG. 3 illustrates a perspective view of a reservoir included in the device illustrated in FIGS. 1 and 2.
Figure 4:
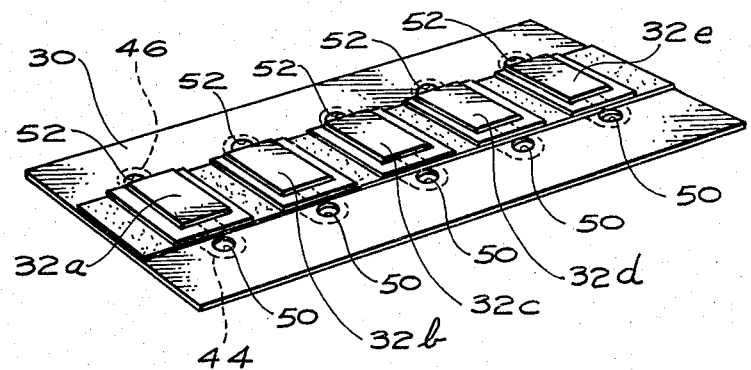
FIG. 4 illustrates a perspective view of a partially assembled device as illustrated in FIGS. 1 to 3.

The first embodiment of the invention illustrated in FIGS. 1–4 is in the form of a device 10 to be carried by a person whose exposure to ionizing radiation is to be monitored. For example, the device might be used by a person having to enter and work in an area contaminated with material emitting ionizing radiation, the device being used to determine when the person should be removed from the contaminated area. Device 10 includes a shell element 12 which includes a depression 14 for accommodating other components of the device. Shell element 12 may be formed of, for example, white styrene having a stiffness similar to that of a credit card and which is non-transparent to visible radiation. The shell element 12 includes a border portion 16 in a first plane and a central portion 18 in a second, parallel and spaced plane. Central portion 18 has five uniformly spaced windows in the form of circular viewing apertures 20a, b, c, d, e disposed with their centers along a common line parallel to the longer sides 22 of shell element 12.

Disposed in depression 14 is a radiation sensitive unit 24 (FIG. 2) including an imaging sheet 26, a mask sheet 28, a cover sheet 30, five reservoirs in the form of pods 32a, b, c, d, e, a pod cover sheet 34 and spacer means 43. Imaging sheet 26 comprises a flexible transparent polyester support sheet carrying a mordant layer; a white reflecting layer; a layer opaque to visible radiation; a fast speed emulsion associated with a yellow dye forming material; a medium speed emulsion associated with a magenta dye forming material; and a slow speed emulsion associated with a cyan dye forming material. The layers are on the side of the support sheet which is facing away from shell element 12, that is, the side which is towards the interior of the radiation sensitive unit 24.

For a greater understanding of the sensitive layer structure reference may be made to British Pat. No. 1,330,524, and for an example of specific chemistries reference may be made to U.S. Pat. No. 4,076,529. The disclosures of those two patents are specifically incorporated herein by reference. In those two patents the relative sensitivities of the several layers are balanced because a photographic product is intended. In the present radiation sensing devices the emulsions are of different relative sensitivities.

Mask sheet 28 is paper or polymeric material impermeable to processing composition and has the same peripheral dimensions and shape as the imaging sheet 26. The mask sheet has five apertures 42a, b, c, d, e aligned with apertures 20a, b, c, d, e respectively when radiation sensitive unit 24 is disposed in depression 14 in the shell element 12. Apertures 42 are larger in diameter than apertures 20 and their boundaries lie outside the boundaries of the apertures 20. Apertures 42 are of a size similar to that of the contact area of a finger and thumb when pinched together. The apertures 42 each include two ear-like sections 44 and 46 extending from the otherwise circular shape. The purpose of the ear-like sections 44 and 46 will be described below.

Disposed in each aperture 42 in the mask sheet is a spacer means in the form of a piece 43 of mesh material woven from monofilaments with about 60 filaments to the centimeter. A suitable material is NITEX screen material, reference HC3-136 manufactured by Tetko Incorporated of 422 Saw Mill River, Elmsford, N.Y. 10523. Each mesh piece 43 and the sheet 28 have a thickness, in the present embodiment about 0.07 to 0.13 mm, such that when imaging sheet 26 and cover sheet 30 are in contact with opposite faces of the piece 43, processing composition will be spread in aperture 42 to the thickness desired for proper processing. The mask sheet 28 is secured and sealed to the imaging sheet 26 in such a manner that processing composition cannot spread between the two sheets 26, 28.

Cover sheet 30 is formed of flexible polyester which is impermeable to the processing composition and has ten holes 50 and 52 disposed to align with sections 44 and 46 respectively when unit 24 is assembled. Cover sheet 30 is secured and sealed to the mask sheet 28 so that processing composition cannot spread between the two sheets 28, 30.

Coated on cover sheet 30 is a layer of acid material suitable for neutralizing the alkaline processing composition. Over the acid layer is a timing layer which prevents contact of the acid layer with the processing composition until after the elapse of a period of processing time sufficient to allow processing of the radiation sensitive layers.

It will be understood that mask sheet 28, cover sheet 30, and apertures 42 form chambers for processing composition over zones of the sensitive material, each chamber being the space in the aperture in the mask sheet and each zone of sensitive material being that area of material which faces into an aperture in the mask sheet.

Figure 2:
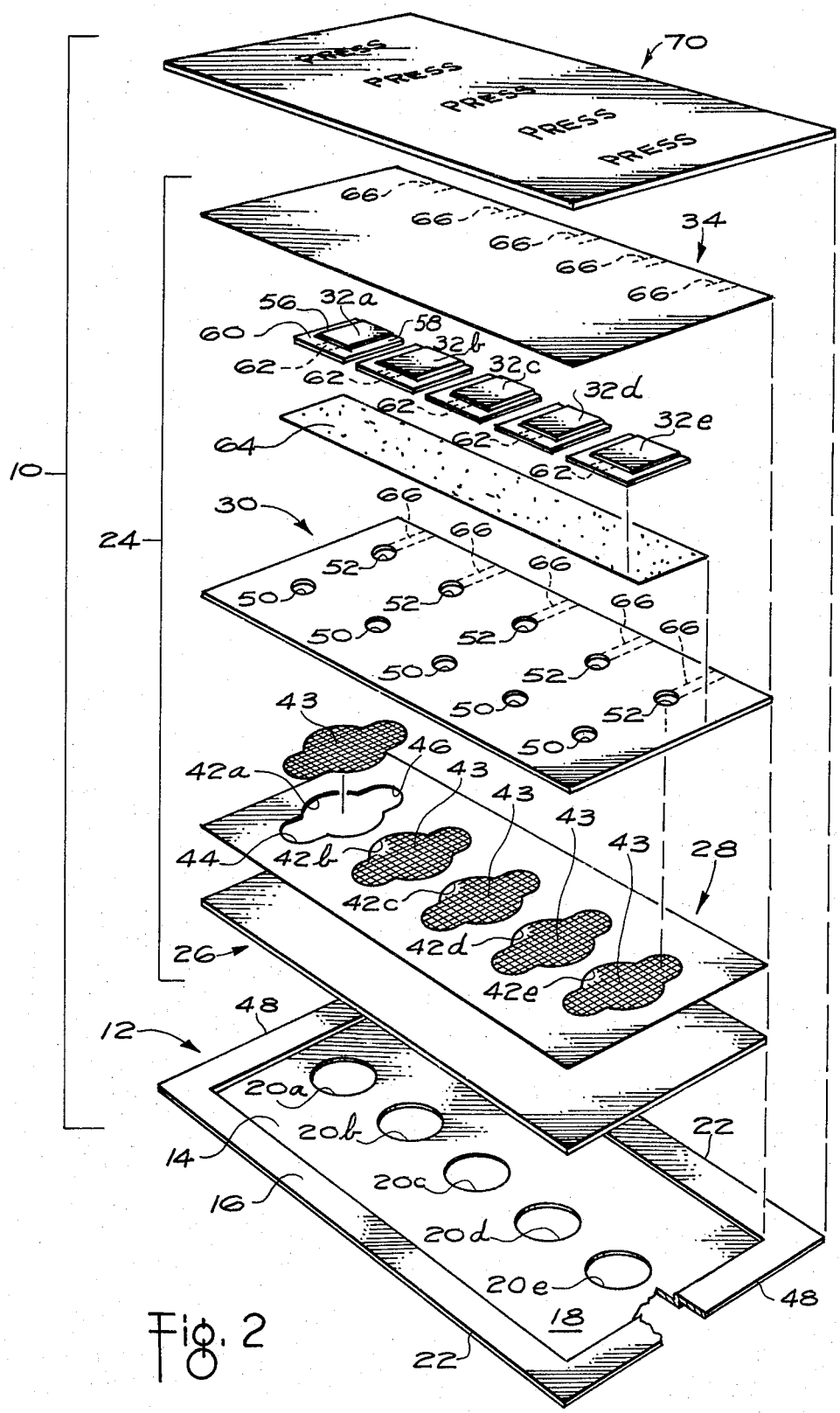
FIG. 2 illustrates an exploded view of the device illustrated in FIG. 1.

Disposed above (as seen in FIG. 2) cover sheet 30 are the five pods 32 of processing composition. The pods are formed of flexible material impermeable to the processing composition and to oxygen and which is capable of being ultrasonically or otherwise sealed to itself when folded over onto itself.

Each pod 32 (best seen in FIG. 3) is formed from a single piece of sheet material which has been folded at line 54. The two overlying portions of the sheet material forming the pod in a middle portion 62 of one margin 60 are sealed together less strongly than the other margins 56 and 58 and the other portions of margin 60, whereby middle portion 62 constitutes a burst seal to release the processing composition in a predetermined location and manner when a predetermined compressive force is applied by fingers to the pod.

The burst seal of each pod is disposed contiguous with a respective hole 50 in cover sheet 30 as may be seen in FIG. 2. Pods 32 are secured to cover sheet 30 for example by a double-faced adhesive tape 64. The pods contain processing composition which is termed herein low viscosity in that it flows readily. In the present embodiment the viscosity is in the range 100–10000 cps.

As seen in FIG. 2, pod cover sheet 34 overlays pods 32 and has the same peripheral dimensions and shape as cover sheet 30, mask sheet 28 and imaging sheet 26. Pod cover sheet 34 is formed of polyester which is impermeable to the processing composition and opaque to visible light.

Pod cover sheet 34 is sealed to whatever underlies it at each particular place. Where the cover sheet is underlayed by a pod it is sealed to the pod; where it is directly underlayed by adhesive tape 64 it is sealed to the tape, and where it is directly underlayed by cover sheet 30 it is sealed to the cover sheet 30. However those areas of pod cover sheet 34 which overlay apertures 50 and 52 are not sealed through apertures 50, 52 and underlying ear sections 44 and 46 of apertures 42, to the imaging sheet 26. This substantially overall sealing of pod cover sheet 34 to whatever underlies it, together with the fact that the undersides of pods 32 are entirely sealed to adhesive tape 64, constrains processing composition leaving a pod to flow only into the adjacent aperture 50.

Apertures 52 allow air to escape from the chambers as processing composition fills the chambers. To allow air to continue its escape, vent paths 66 are created by not sealing the pod cover sheet 34 to cover sheet 30 along these paths 66.

It will be recognized that each pod 32 overlies its related aperture 42. Thus, there is a tendency for the portions of imaging sheet 26 and cover sheet 30 juxtaposed with aperture 42 to approach one another when the fingers are squeezing to burst a pod. If these portions were allowed to come into intimate contact, processing composition could not reach all of the radiation sensitive material in the zone. Mesh piece 43 prevents the cover sheet and imaging sheet contacting one another and ensures that there is a space between the two sheets in aperture 42, and ensures that the thickness of the space is within the range of satisfactory minimum thickness of processing composition.

The radiation sensitive unit 24 disposed in the depression 14 in shell element 12, is covered by a diaphragm member 70 which is bonded to border portion 16 of shell element 12. Diaphragm member 70 is formed from, for example, a laminated material including lamina of plastics, metal foil and paper. The diaphragm member 70 is flexible to permit compression of the pods individually by squeezing between fingers and preferably is impermeable to any processing composition which might escape from its intended confines. Preferably the diaphragm member provides some physical protection against undesired rupture of the pods.

The diaphragm member 70 has on its surface, which is exposed to view at the exterior of the device, legends or drawings to indicate where a finger should be placed in order to squeeze each pod. In the present embodiment the word PRESS is printed on the diaphragm in five locations overlying the five pods.

Although not included in the present embodiment, the diaphragm may include or have secured to it, a pin, clasp or hook or other means for detachably securing the device 10 to the clothing of a user of the device.

Alternatively, the device 10, being quite thin, may be carried in a pocket.

The device is supplied in a wrapper (not shown) which is opaque to the radiation the device 10 is intended to monitor and it is not withdrawn from the wrapper until it is desired to use it. To use the device 10 to monitor ionizing radiation, it is taken from its wrapper and associated with the body of the person whose exposure is to be monitored. When it is desired to determine the amount of ionizing radiation to which the device, and hence the person bearing the device, has been subjected since he or she started to wear the device upon its withdrawal from its wrapper, pod 32a, or 32e adjacent one end of the device is caused to burst. The selected pod, say 32a, is burst by placing the thumb over the aperture 20a and the first finger over the word PRESS overlying the aperture 20a, and squeezing so that pod 32a bursts at its burst seal middle portion 62. The processing composition is squeezed, by the finger pressure, out of pod 32a and flows through aperture 50 into and through ear section 44 and spreads out in the chamber and covers all of the zone of radiation sensitive material facing into the chamber.

Air in the chamber is forced out through aperture 52 by the advancing processing composition and then flows through vent path 66 to the exterior of the unit.

The processing composition in contact with the radiation sensitive material of imaging sheet 26 processes the material and causes one of four possible effects to occur:

1. If the amount of radiation has been less than a first threshold value no color will migrate to or be created in the dye-mordant layer and the observer will continue to see white behind aperture 20a.

2. If the amount of radiation is between a first threshold and a second threshold the fast speed emulsion with a yellow dye producing material will produce a yellow color visible through aperture 20a.

3. If the amount of radiation is between a second threshold and a third threshold the fast speed emulsion will cause creation of a yellow dye and the medium speed emulsion will cause creation of a magenta dye. Both of the yellow and magenta dyes will be visible through aperture 20a and will appear as a reddish color to the observer.

4. If the amount of radiation is greater than the third threshold value the slow speed emulsion with cyan producing material will cause creation of cyan dye. In this case yellow, magenta, and cyan dyes will be visible from the exterior and will appear to an observer as black.

A key 72 may be provided on the front of the device, see FIG. 1, which has blocks 74, 76, 78 of the three colors which may be produced, to act as comparators, and may have legends associated with each color block.

Later, the second zone, i.e., that lying behind aperture 20b, may be processed in the manner described above, except that this time the first finger is placed over the word PRESS associated with pod 32b and the thumb is placed over aperture 20b. Since all unprocessed zones of the radiation sensitive material are integrating their exposure from the same original time at which the device was taken from its wrapper, the amount of radiation to which the zone of sensitive material adjacent aperture 20b has been exposed is equal to that to which the now processed zone was exposed prior to processing plus that to which the device has been exposed since the processing of the first zone. Therefore, the second zone is indicative of exposure since the original time and not just since the processing of the first zone.

The third, fourth, and fifth zones are processed at will in the manner described above, with the thumb and first finger being appropriately placed on each occasion.

The color indications thus give a rapidly available and readily observable indication of the approximate amount of exposure of the bearer.

Disposing pods 32 over their respective related apertures 42 has, besides the advantage of keeping the device as small as possible, the advantage that any tendency of imaging sheet 26 and cover sheet 30 to move away from one another under the influence of pressure in the processing composition in the chamber aperture 42, is substantially eliminated. It is necessary for satisfactory processing to have a known and uniform thickness of processing composition. The inwardly directed finger pressure allows the use of less stiff, and hence cheaper, components than would be necessary to prevent pillowing of the sheets 26 and 30, with concomitant excessive and non-uniform processing composition layer thickness in the absence of finger pressure directed into the apertures 42.

Figure 5:
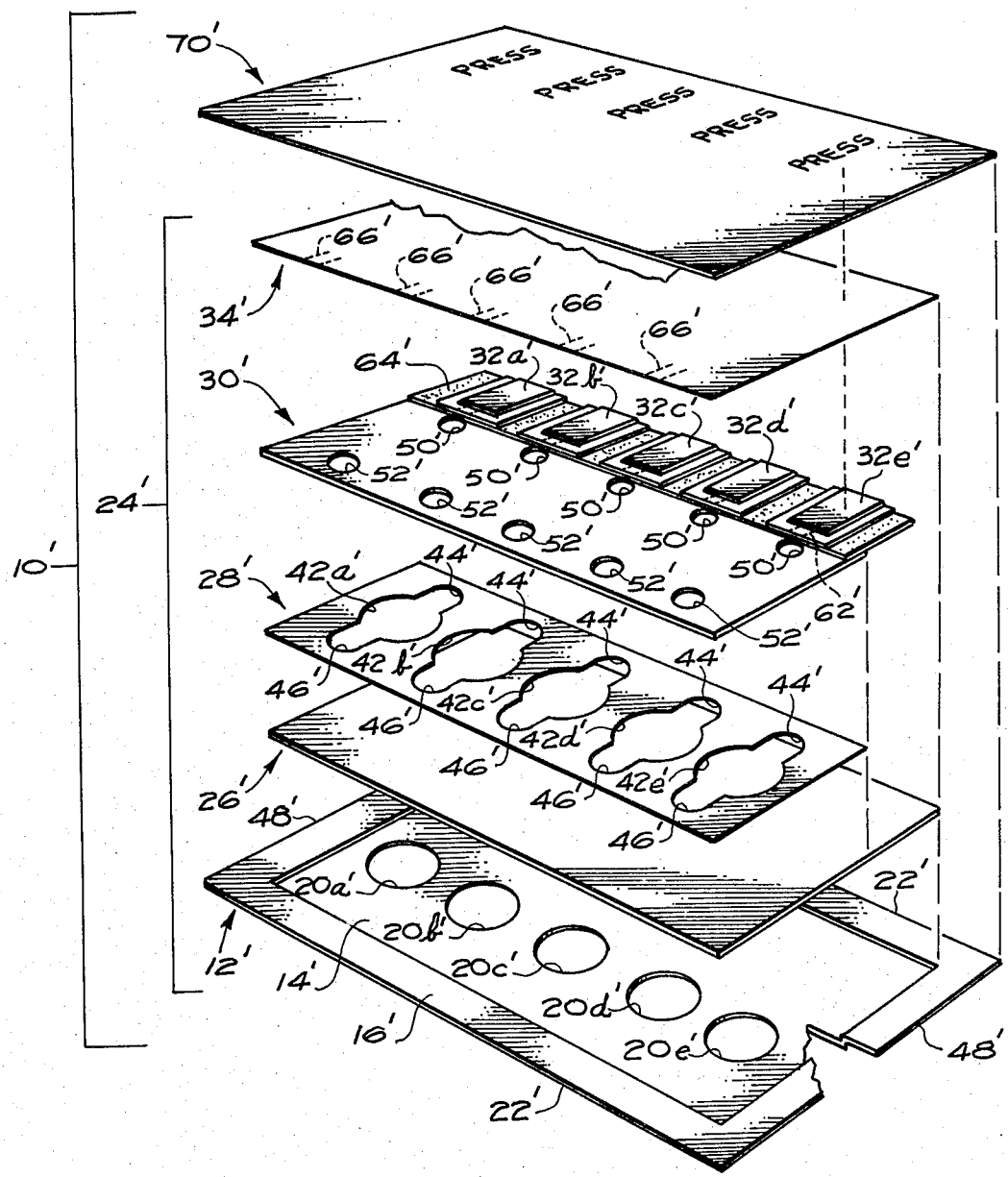
FIG. 5 illustrates a view similar to that illustrated in FIG. 2 showing a second embodiment of the present invention.

In FIG. 5 there is illustrated an embodiment in which pods 32 do not overlie their related apertures.

Parts in the second embodiment having substantially the same nature and role as parts in the first embodiment have been given the same reference designation as their counterparts in the first embodiment but with a prime (') suffix. Only differences between the two embodiments will now be described.

The second embodiment has the same length as the first embodiment but is wider because the pods lie to the side of, rather than over, the chambers.

Pods 32a', b', c', d', e' are identical to the pods 32a, b, c, d, e but are located between apertures 50' and adjacent longer side 22' of cover sheet 30'. Burst seal portions 62' of the pods are again contiguous with apertures 50' so that when a pod is burst the processing composition will flow into adjacent hole 50' and into aperture 42'.

The pod cover sheet is sealed to all that it directly overlays, except directly over apertures 50' and 52'. In this way, processing composition flowing out of a pod is constrained to flow only into adjacent hole 50' leading to the space in aperture 42'.

In this second embodiment, because the external finger pressure is offset from the zone to be processed there is a possibility that the imaging sheet and cover sheet might tend to pillow under the influence of pressures in the processing composition in the space in the aperture. Pillowing must not occur because it is a symptom and/or cause of incorrect thickness of the spread layer of processing composition. A tendency to pillow may necessitate the provision of structural means to prevent the sheets 26' and 30' pillowing under the influence of the pressures in the processing composition. These structural means may include stiffness of the sheets 26' and 30' and/or the provision of stiff material overlying the apertures 42', which is transparent at least adjacent sheet 26' to allow observation of a color change. The necessary stiffness may be achieved from a housing such as the shell element 12' and diaphragm 70'. Because pressure to burst the pod is not directed into the aperture, mesh pieces may not, in some instances be included.

The legends or drawings on the diaphragm member indicating where to squeeze are, of course, appropriately located for the position of the pods in the second embodiment.

It is, of course, desired in regard to each embodiment that when finger pressure is applied to one pod the diaphragm member does not apply that force also to an adjacent pod.

The spacing means described above for ensuring that the imaging sheet and cover sheet are not squeezed into such intimate contact that spreading of processing composition over the radiation sensitive material would be prevented, is a mesh woven from monofilaments. However, other spacing means for ensuring freedom for spread of the processing composition may be adopted, such as a material formed of non-woven nylon fibers. Such a material is marketed to Monsanto Corporation of 800 North Lindbergh Boulevard, St. Louis, Missouri 63166, under the name CEREX and has a weight of about 10 gms. per square meter. Instead of fibers, a layer of polymeric or glass beads may be included in the surface of the cover sheet with the beads touching or nearly touching each other.

Figure 6:
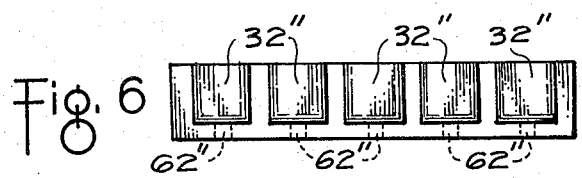
FIG. 6 illustrates a pod unit for processing composition and includable in embodiments of the present invention.

In the embodiments described above there is a reservoir in the form of a pod forming a source of processing composition for each zone of radiation sensitive material. However, a single pod unit having a plurality of compartments each forming a reservoir and each containing the processing composition required to process a single discrete zone may be used instead of a plurality of individual pods. Such a pod unit has advantages in handling and manufacture and is illustrated in FIG. 6. In FIG. 6 each reservoir is designated 32" and each burst seal is designated 62".

In the embodiments described above three different emulsions having different speeds and each associated with a different dye producing material, are included in the device. However, it is not necessary to provide for three different color signals, which together with the white color, provides for indication in four ranges. Embodiments of the invention may provide for just a single color signal (which might be black) so that an indication may be gained of whether the dosage of radiation is above or below a certain value.

It will be appreciated that any indication showing at the exterior of the radiation sensitive unit and derived from the areas of radiation sensitive material opposite the ear sections of the apertures in the mask are obscured from view at the exterior of the device. This is achieved by giving the apertures in the shell element a shape different to that of the apertures in the mask sheet and allowing the shell element to act as a mask. It is desirable not to allow observation of the signals derived from the areas of radiation sensitive material juxtaposed to the ear sections of the apertures in the mask sheet. This is because those areas have a greater thickness of processing composition on them and also because that processing composition does not back up to timing and acid layers on the cover sheet. The greater amount of composition and the absence of neutralization of the composition after a certain period of time have the effect of processing those areas of the sensitive material differently and possibly creating a different color signal. Observation of two signals in one aperture of the shell element might be confusing.

If the radiation sensitive material in the device is sensitive not only to the radiation it is desired to monitor but also to other radiation, the other radiation should be prevented from reaching the sensitive material if it would have a detrimental effect on the accuracy of the device in its intended use. For example, if it is desired to monitor X-radiation, visible radiation would be excluded from the sensitive material by making the unit opaque to light. This is done by including a light opaque coating between the white reflecting layer and the first sensitive emulsion of the imaging sheet, and by including, for example, carbon black in the cover sheet and the pod cover sheet. Another embodiment might be arranged in monitor ultra-violet radiation. In this case filter material for visible components of the spectrum would be provided between the white reflecting layer and the first coated sensitive emulsion. The components behind the imaging sheet, i.e., the mask sheet, cover sheet and pod cover would be made opaque. This has the effect of making the device directional, that is, only radiation impinging on the front of the imaging sheet will be monitored.

In the embodiments described above the sensitive materials and the mordant layer are on the same support. It is to be understood that embodiments in which the sensitive layers are on one support and in which the indication producing material migrates through the processing composition to a receiving layer on the opposed support, are within the invention.

The embodiments specifically described above are intended for conducting five readings. It will be observed that each reading site may be so small that if it were to be formed as a discrete entity it would be inconveniently small, for example about the size of a small postage stamp. Thus, the formation of a plurality of reading sites in one unitary strip has advantages to the user as well as in manufacturing in economy of materials and facilitated handling.

Although the invention has been described with particular reference to a preferred embodiment thereof it will be readily understood that variations and modifications can be effected within the spirit and scope of the invention as described hereinabove and as defined in the appended claims.

What is claimed is:

1. A device for periodically monitoring exposure to an influence adverse to the human body, said device comprising:
    a support;
    a continuous layer of material on said support sensitive to the influence and processable to produce an indication visible at the exterior of the device indicative of the amount of exposure to said influence;
    a first sheet sealed to said support and having apertures establishing a plurality of discrete zones of said material on said support;
    a second sheet sealed to said first sheet opposite said support and covering said apertures, said first and second sheets and said support bounding chambers in said apertures in said first sheet; said second sheet having holes therein for flow of processing composition through the second sheet into the chambers;
    a plurality of reservoirs of processing composition associated one with each of said zones for processing said material; each of said reservoirs being rupturable individually to release said composition for flow through the associated one of said holes in said second sheet to the associated one of said chambers.

2. The device of claim 1 wherein:

said material is sensitive to influences other than that to be monitored, said device including means for inhibiting said other influences reaching said material.

3. The device of claim 1, wherein:
said reservoirs of processing composition overlie said chambers, said device including spacer means in said chambers for limiting movement of said support and second sheet towards one another in said chambers under the influence of finger pressure applied to burst said reservoirs.

4. A device for monitoring exposure to radiation adverse to the human body, said device comprising:
a support;
a continuous layer of material on said support sensitive to the radiation and processable to provide an indication visible at the exterior of the extent of the exposure to the radiation;
means demarcating a plurality of zones of said material;
means forming a plurality of chambers one on each of said zones, said chamber forming means including a cover sheet having holes therethrough providing access through said cover sheet to said chambers; and
a plurality of reservoirs of composition for processing said material in said zones, respectively, each of said reservoirs being rupturable individually to release said composition for flow through a respective one of said holes into an associated one of said chambers for processing the material in the associated one of said zones.

5. The device of claim 4, including:
a unitary pod unit including a plurality of compartments, each compartment forming a respective one of said reservoirs.

6. The device of claim 4, wherein said means demarcating a plurality of zones of said material includes:
a mask sheet disposed between and sealed to each of said support and said cover sheet and having a plurality of apertures, said mask sheet and said support being further components of said chamber forming means.

7. The device of claim 4, wherein:
said reservoirs are located in overlying relationship with said chambers respectively at the opposite side of said cover sheet and are disposed for discharge into said holes in said cover sheet.

8. The device of claim 5, wherein:
said reservoirs are located out of overlying relationship with said chambers at the opposite side of said cover sheet and are disposed for discharge into said holes in said cover sheet.

9. The device of claim 7, further including:
spacer means disposed in each chamber for limiting movement of said support means and said cover sheet towards one another in said chamber.

10. The device of claim 9, wherein:
said spacer means is formed of filamentary material.

11. Device for monitoring exposure to invisible radiation, comprising:
a transparent support;
a plurality of layers on said support including (1) a mordant layer, (2) a layer opaque to visible radiation, and (3) a layer including material sensitive to invisible radiation and a dye producing material;
a mask sheet over said layers and having a plurality of apertures, each aperture demarcating a zone of said layers;
a cover sheet over said mask sheet and having openings open to said apertures respectively;
a plurality of reservoirs of processing composition disposed for discharge into said openings in the cover sheet respectively; and
means sealed to said cover sheet for covering said reservoirs and forming paths for flow of processing composition from said reservoirs to respective openings in said cover sheet.

12. The device of claim 11, including:
spacer means in said apertures in said mask sheet for limiting movement of said support means and said cover sheet toward one another.

13. The device of claim 12 wherein:
said reservoirs are disposed in overlying relationship with said apertures respectively.

14. The device of claim 11, further including:
an enclosure surrounding said support, mask sheet, cover sheet, reservoirs and covering means, said enclosure including:
a member having a plurality of windows therein, said windows being disposed to overlay said zones respectively; and
a diaphragm member secured to the periphery of said member, and including on its exterior indications of the locations of said reservoirs.

* * * * *